Feb. 18, 1941.  W. R. BARRETT  2,232,426
PIGMENT DISPERSION
Filed Jan. 3, 1939

Inventor
Willard R. Barrett
By R. F. Miller
Attorney

Patented Feb. 18, 1941

2,232,426

UNITED STATES PATENT OFFICE 2,232,426

PIGMENT DISPERSION

Willard R. Barrett, Flint, Mich., assignor to E. I. du Pont de Nemours & Company, Wilmington, Del., a corporation of Delaware Application January 3, 1939, Serial No. 249,112

8 Claims. (Cl. 134—51)

This invention relates to coating compositions and more particularly to the manufacture of improved paints, enamels, and the like.

Incorporation of pigment into the vehicles of paints and enamels has long been a slow and costly operation. The earlier known of the existing methods for dispersion of pigment into the normally used vehicles include a range of mechanical treatments such as simple agitation, stirring devices, agitation or dispersion in ball mills, friction blade mills, pebble mills, buhrstone mills, and the like. All of these methods involve considerable time and expense. The more drastic treatments proposed in an attempt to obtain a more complete and efficient dispersion of the pigment with the vehicle include the vigorous mechanical working obtained by means of a kneading machine or by passing the pigment-vehicle mixture between a pair of rollers revolving at different speeds. In the case of kneading machines, the pigment-vehicle mixture is a highly adhesive and cohesive mixture of pigment and plastic colloid. In some instances the necessary high viscosity to obtain the desired shearing action has resulted from the use of a thermoplastic resin in the absence of substantial amount of solvent, and maintained, usually with the additional aid of heat, in a stiffly plastic state during the working period. It has also been proposed in the dispersion of pigment with vehicle in kneading machines to use a large proportion of pigment to vehicle to obtain the high viscosity required for the desired shearing action. But this procedure alone in the absence of the further treatment described herein will not yield the complete degree of dispersion with the resulting improvement in color, luster and freedom from settled material which characterize the products otbained by the process of the present invention.

The use of differentially speeded rollers in pigment dispersions is desirable because of simplicity of operation and because of the high shearing and dispersive forces involved. But in this method as heretofore practiced the pigment content of the product from the roll mill could not be too high since a substantial quantity of the vehicle must be present in order that the pigment-vehicle mixture can be dissolved or dispersed readily in the thinning liquid. The amount of pigment dispersed in a given mass has therefore been limited in roller mill operation. Further, the products obtained by operation in roller mills, kneading machines, and by other methods previously used, are markedly less satisfactory in color, gloss, flowing and settling properties than the products obtained by the new process described herein. The higher temperatures required in some of the more efficient previously known methods of pigment dispersion often rise so high as to cause burning and the subsequent loss of cleanliness of color.

This invention has as an object a new and improved method for manufacturing paints, enamels, and the like. A further object is a new method of treating pigment-vehicle mixtures in the preparation of pigmented coating compositions. A still further object is a highly efficient and economical method of pigment dispersion in which a very large amount of pigment is incorporated in a given amount of material being processed. Other objects will appear hereinafter.

These objects are accomplished by the following invention in which improved paint and enamels are obtained by the methods hereinafter described which involve the dispersion of a large amount of pigment with a small amount of thin liquid vehicle and the reduction of the well dispersed pigment mixture to a smooth stable dispersion in paste or final liquid form with vehicles and thinners of the paint and enamel type.

The present process may be thought of as being composed of the three stages which now constitute the best embodiment of the invention, although variation in the particular means employed or combination of some of these stages into a single step is not precluded. These stages are the preliminary mixing of the pigment and small amount of the thin liquid vehicle, the dispersion of the pigment with the thin vehicle by passing the mixture between two rollers revolving in the opposite direction at different speeds, and the final working of the product of the roller mill with the paint or enamel vehicles and thinners. For this last stage the mechanism shown in the accompanying drawing, and described in detail following the description given below of the first two stages, is most advantageously used since it makes possible the application of the unusually powerful forces required for efficient reduction to solution or dispersion of the high pigment-low vehicle product of the roller mill into the paint or enamel liquids.

In the first or preliminary mixing stage, which results in a partial dispersion, the vehicle used, as mentioned above, is a relatively thin liquid obtainable in most instances by the use of thinner. However, suitable vehicles initially sufficiently thin without the addition of solvent may be used when available. In the case of the synthetic resins, which are the preferred vehicles, the thinner usually consists of about 50% of the total composition but somewhat greater or lesser amounts, as for instance from 42% to 60%, may be used satisfactorily depending upon the character of the resin. In the case of natural resins, bodied oils, etc., the amount of thinner usually ranges from 20% to 45%. The viscosity of the solution of vehicle in thinner is usually from 15 seconds to 247 seconds as determined in a 10 F. L. cup. This viscosity is determined by the number of seconds required for 50 cc. of the liquid at 25° C. to flow through a 0.1 inch diameter orifice in a cylinder whose inside dimensions are 3.6 inches high, 1.37 inches in diameter, and whose volume is 87.7 cubic centimeters. The thin vehicle may be mixed, as for instance, in a tumbling barrel or other suitable equipment with such large amount of the pigment that an apparently dry, powdery or pellet-like mixture is obtained. This amount of pigment is substantially the largest quantity relative to the amount of the thin liquid vehicle that will permit the pigment-vehicle mixture to be rolled into sheets in the subsequent stage of passing the mixture through the roller mill. The relative quantities of pigment and liquid used for the production of this pigment-vehicle mixture vary widely because of the nature and viscosity of the vehicle, and particularly because of the large difference in the oil absorption (that is the tendency of the pigment to absorb the vehicle) of the different pigments. Thus for 100 pounds of pigment these quantities will vary from about 185 parts by weight of the thin liquid vehicle in the case of carbon black to 8 parts by weight of the liquid in the case of chrome orange pigment. Oil absorption constants obtained from a common oil, such as linseed, cannot be followed when the liquid used is other than the one used in setting up the factor since the wetting ability of different liquid vehicles vary considerably. The following table indicates for each 100 pounds or 100 volumes of pigment the weights and volumes most satisfactorily used in the case of the liquid vehicle of the kind given in the subsequent examples.

TABLE

| Kind of pigment | Weight of vehicle per 100 pounds of pigment | Weight of vehicle per 100 volumes of pigment |
| --- | --- | --- |
| Carbon black | 185 | 330 |
| Do | 170 | 297 |
| Milori blue | 106 | 190 |
| Lithol red | 76 | 114 |
| Toluidine toner | 57 | 88 |
| Bone black | 48 | 150 |
| Deep chrome green | 43 | 135 |
| Ultramarine blue | 42 | 110 |
| Ferrite yellow | 35 | 146 |
| Light chrome green | 19 | 108 |
| Light chrome yellow | 17 | 110 |
| Persian gulf iron oxide | 16.5 | 74 |
| Medium chrome yellow | 13 | 89 |
| Chrome orange deep | 12 | 80 |
| Chrome orange light | 8 | 59 |

In the second stage of the process the high pigment-low vehicle content mixture described above is passed through the ordinary two-roll mill, such as used in the rubber industry. Four to six passes through the rollers usually is sufficient. The product of the roller mill approaches as about its highest consistency a rubbery condition, and in all instances it has little tensile strength, is readily deformed by slight pressure, and requires the application of but small force to cause relative movement between adjacent portions of the mass. In most instances the product is pasty or doughy and the material after it leaves the rolls in the form of weak sheets is readily gathered by the hands as a soft shapeless mass for another pass through the rollers or for the further treatment in the following stage which makes possible conversion to liquid form of the roller mill dispersed pigment-vehicle product in which each fine pigment particle is enveloped by a thin coating of the liquid vehicle. The solvent loss is quite small in this operation and is usually less than 1%.

In the third stage of the process the product of the two-roll mill is incorporated into the paint or enamel. Mechanism by means of which this step is best accomplished is shown in the accompanying drawing in which Fig. 1 is an isometric view with parts broken away showing the mixing apparatus with its arrangement of double worms used in the practice of this invention;

Figure 1:
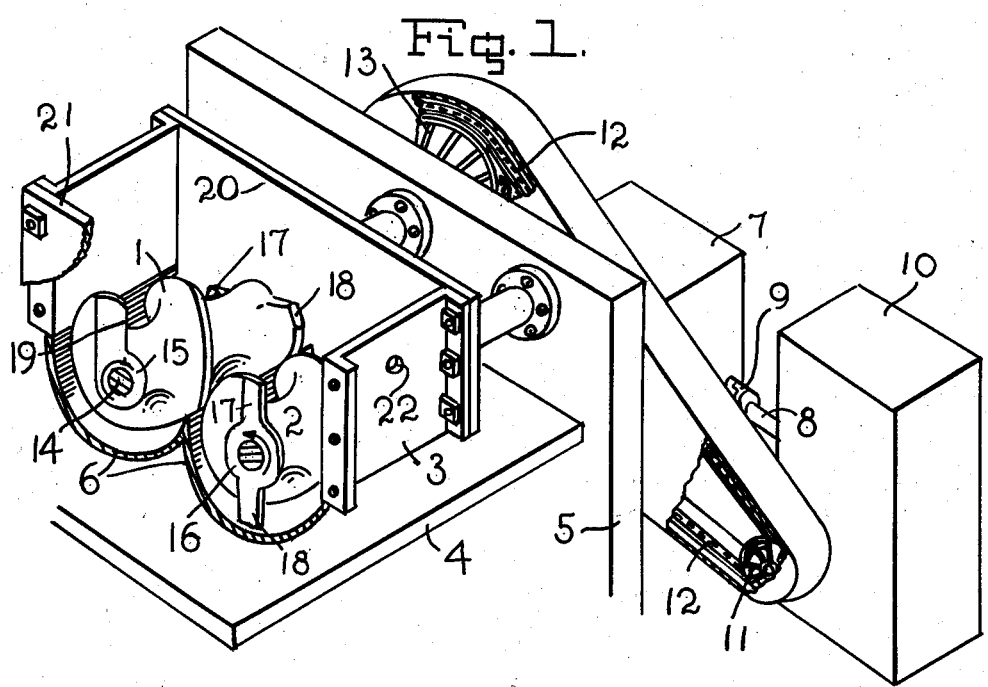
Figure 2:
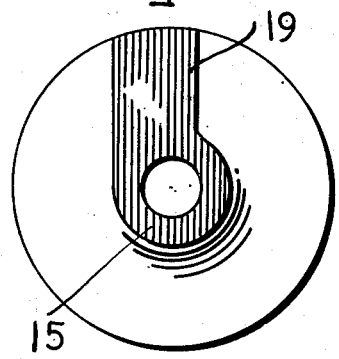
Fig. 2 is a view of the scraper end of the worms.
Figure 3:
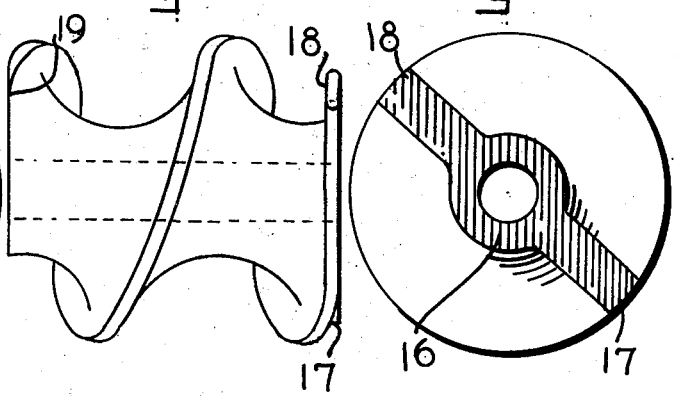
Fig. 3 is a side view of one of the duplicate worms.
Figure 4:
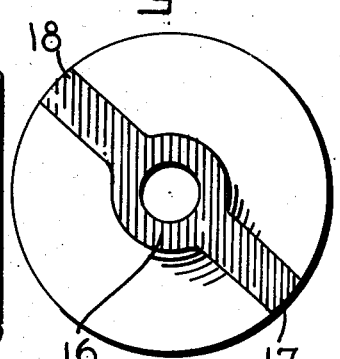
Fig. 4 is a view of the extrusion end of the worms.

The closely adjacent pairs of worms 1 and 2 are rotatably mounted with their axis parallel in the vessel or tank 3 mounted on a suitable support or frame structure which includes the horizontal member 4 and a vertical member 5. The bottom of the vessel is formed into two troughs extending under and along the worms as shown.

The worms are rotated in opposite directions by a motor 7 which by means of shaft 8 and clutch 9 drives suitable reduction gearing in the housing 10 from which the sprocket 11 is driven. The chain 12 connects the sprocket 11 with the larger sprocket 13 rigid with one of the worm shafts 14 which are in turn rigid with the worms. The other worm is driven at the same speed in the opposite direction by means of spur gears not shown which connect the two shafts. The worm shafts are rotatably mounted in conventional manner in the side members 20 and 21 of the tank.

The ends of each worm are somewhat differently formed, the end indicated by the numeral 15 being the scraper end and the end indicated by the numeral 16 being the extrusion end. The pitch of each worm becomes zero at the extrusion and only on which is formed the extrusion or dispersion blades 17 and 18, the planes of which are at right angles to the worm axis. The outer end of one blade, 17, is the termination of the worm spiral which recedes back of the plane of the blades so that the outer end of the opposite blade 18 is spaced one-half the pitch of the worm from the adjacent spiral. This last mentioned blade although desirable is not essential. The scraper end 15, however, has a relatively sharp edge 19 as would be formed by cutting through the worm at right angles to the axis.

In the construction shown in the drawing the portion of the spiral where the pitch is zero, a width of one to a few inches from the edge of the spiral perpendicular to the worm axis, is machined to a flat face to form the dispersion blade 17. The supplemental blade 18, cast integral with the hub of the worm, is of zero pitch for at least a portion of its width, this portion being formed with a face similar to that on blade 17.

These faces are in the same plane and are parallel but may be off set in the sense that the plane of one blade is not necessarily an extension of the other through the hub. The blade 18 may be wider than the dispersion face formed therein and extend beyond it in the direction of rotation and this additional width formed into a leading portion which follows the pitch of the worm.

During the mixing, vehicle is added to the mixer through a conduit passing through the orifice 22, and suitable means not shown are provided for emptying the liquid or semi-liquid composition from the tank.

For a thirty gallon mixer the diameter and length of the worms is preferably about 15 inches, the pitch 9 inches, revolutions per minute 63, and the width of the dimension of the tank at right angles to the worm axis about 30 inches. These figures may of course vary somewhat, as for instance the worm length may be 30 inches, the pitch from 6 to 12 inches, and the revolutions per minute from 25 to 90.

Before the stock mass from the roller mill is transferred to the mixer about 2% to 6% of the vehicle ultimately added to form the liquid coating composition is put into the mixer. This small amount of initially added vehicle acts as a lubricant to prevent excessive stresses on the machine that would result if the pigment mass alone were put into the mixer. The peculiar action of the parallel worms arranged as above described renders homogeneous the pigment mass from the rollers with additional vehicle slowly added while the mixer is in operation.

In operation, a portion of the pigment mass conveyed by the worm 2 to the extrusion end 16 is squeezed with a wiping action under great force against the end plate 21 or other abutment member spaced slightly, usually about 1/16 inch, from the end worm. The material between the end plate 21 and the worm 2 is wiped toward the worm 1 and is taken up at the scraper end of that worm which conveys the pigment mass to the opposite or extrusion end of worm 1 where the pigment mass is squeezed against the end plate 20 and transferred to the scraper end of worm 2. This circuit of action, in which portions of the pigment mass are continuously squeezed under great force and incorporated into the body of the material being treated, is continuously repeated with gradual addition, continuous or portionwise, of such amount of vehicle that the resulting product is a completely dispersed mixture in semi-liquid or paste form from which the final coating composition may be obtained by simple mixing, either in or outside the mixer, with the further paint or enamel vehicles, thinners or mixtures thereof which are referred to herein as the solvent vehicle.

The preferred methods used in carrying out the invention are illustrated by the following examples in which the parts are by weight.

EXAMPLE I

GREEN ENAMEL

*Resin solution "A"*

| | Parts |
|---|---|
| Resin | 55 |
| Thinner | 45 |

This is an oil modified linseed oil glyceryl phthalate resin obtained by heat treatment of phthalic anhydride and the mono and/or diglyceride of linseed oil. The composition of the resin may be expressed as 48 parts glyceryl phthalate and 52 parts linseed oil.

The thinner consists of 67 parts of mineral spirits and 33 parts of hydrogenated naphtha (high in aromatic hydrocarbons) with a boiling range of 135 to 190° C.

*Resin solution "B"*

| | Parts |
|---|---|
| Resin | 50 |
| Thinner | 50 |

The composition of the above resin is 50.5 parts glyceryl phthalate, 13.9 parts China-wood oil, 34.6 parts linseed oil, and 1.0 part excess phthalic anhydride. The thinner consists of 36 parts of mineral spirits and 64 parts of the hydrogenated naphtha.

15.93 parts of chrome green pigment were placed in a tumbling barrel and after the barrel started revolving there was slowly added, through a perforated pipe placed through the axis of the tumbling barrel, 7.27 parts of the above described resin solution "A" and mixed (by tumbling) twenty minutes. This mixing or partial dispersion may also be accomplished in a heavy duty floor mixer, ordinary paddle-type mixer, or similar equipment, the liquid being added in the normal manner of adding liquid to a mixer. This procedure results in a powdery appearing mixture which is then given the required number of passes over the two-roll mill, the resulting mass being of the consistency of window glazier's putty and having very little tenacity. During the rolling process the pigment mass is kept to near room temperature by the ordinary manner of cooling roller mills. This mode of procedure is possible since the present process does not rely upon the thermoplastic properties of the vehicle to obtain dispersion of the pigment, and in fact any effect of such property is substantially absent due to the use of thin solution containing but a small amount of the resin. The pigment mass is then added to the mixer shown in the drawing. For purpose of lubrication to prevent too great an initial load there is added to the mixer just prior to introduction of the pigment mass about 1 part of resin solution "A" which is then slowly added in further amount of about 16 parts while the mixer is in operation. The resultant semi-liquid mass may then or at some future time be further reduced by simple mixing by adding:

| | Parts |
|---|---|
| Resin solution "A" | 5.1 |
| Resin solution "B" | 34.7 |
| 1% inhibitor solution | .5 |
| High solvency petroleum fraction (boiling range 132–187° C.) | 1.3 |
| Mineral spirits (boiling range 145–221° C.) | 2.6 |
| High solvency hydrocarbon mixture (boiling range 95–100° C.) | 15.0 |

EXAMPLE II

ORANGE ENAMEL 26.53 parts of chrome orange pigment were placed in a tumbling barrel and after the barrel started revolving there was slowly added 2.16 parts of resin "A." The product after continued revolving of the barrel for 20 minutes was a pellet-like mass of pigment and resin solution which has a crumbly appearance. This mass is then given the required number of passes on the two-roll mill while controlling the temperature to slightly above room temperature. This mass was transferred to the mixer and, as in Example I, there was added just prior to this time .25 part of resin solution "A" for lubricating the special worm-like blades in the mixer. While the mixer was in operation there was added to the pigment mixture therein 387 parts resin solution "A" and 1.29 parts resin solution "B." The resultant semi-liquid mass may then or at some future time be further reduced as in Example I by the addition of the following:

| | Parts |
|---|---|
| Resin solution "B" | 51.01 |
| 1% Inhibitor solution | .50 |
| Bakelite solution | 1.50 |
| Manganese naphthanate drier | .05 |
| Lead naphthanate drier | 2.00 |
| Mineral spirits (boiling range 145–221° C.) | 1.39 |
| High solvency petroleum fraction (boiling range 132–187° C.) | .70 |
| High solvency hydrocarbon mixture (boiling range 95–100° C.) | 8.75 |

EXAMPLE III

BLACK "OIL TYPE" ENAMEL

Two varnish solutions "C" and "D" were prepared as follows:

*Varnish "C"—Asphaltum varnish*

32.5 parts petroleum pitch and 19.0 parts gilsonite were melted together at 550° F., allowed to cool, and reduced with 48.5 parts petroleum fraction—high in aliphatic hydrocarbons, boiling range 105–162° C. The resultant viscosity is 25 seconds in a 10 F. L. cup.

*Varnish "D"—China-wood oil grinding varnish*

As an intermediate for this varnish, a limed rosin was prepared by heating 92.3 parts rosin to 450° F., adding until taken up 3.6 parts lead acetate, then 4.1 parts hydrated lime and run to 525° F. Also as an intermediate for this varnish, a lead resinate prepared by heating 75 parts rosin to 525° F., then adding 25 parts litharge slowly until foaming ceases. To 11.7 parts limed rosin heated to 525° F. was added 38.8 parts China-wood oil and 5.5 parts linseed oil. After holding about 20 minutes, 5.7 parts bodied linseed oil and 3.3 parts lead resinate were added. The mass was then cooled and reduced with 35.0 parts mineral spirits having a boiling range of 145–221° C.

3 parts carbon black pigment were placed in a tumbling barrel and the tumbling barrel started revolving. To the pigment in the barrel there was added slowly through a perforated pipe 6 parts of varnish "C" and 1.1 parts varnish "D". These ingredients were mixed by tumbling for 20 minutes. The product was a pellet-like mixture which was then given the required number of passes over the two-roll mill cooled to near room temperature. The resulting mass was of the consistency of window glazier's putty and had very little tenacity. This mass was then transferred to the special mixer to which had been added just prior to introduction of the roller mill product .5 part of varnish solution "C" for lubricating purposes, and slowly, 19.5 parts of varnish solution "C" while the mixer is in operation. The resultant semi-liquid mass may then or at a later time be further reduced by simple mixing by adding .5 part inhibitor solution, 66.4 parts varnish solution "C", and 3 parts petroleum fraction high in aliphatic hydrocarbons and having a boiling range 105–162° C.

The degree of dispersion varies with the type of pigments employed. Pigments which are inherently hard are more difficult to disperse. The majority of the pigments dispersed may be made into satisfactory enamels without further treatment as to straining or clarification. In certain cases as with hard pigments, special treatment such as clarification is required to remove the pigment agglomerates of insufficient fineness. The following pigments have been successfully processed in a similar manner to those described above: Ultramarine Blue, Iron Blues (Chinese, Prussian, and Milori), Chrome Yellow, Toluidine Red, Chrome Orange, Chrome Green, Iron Oxide, Ferrite Yellow, Bone Black, Carbon Black, Lamp Black, Titanium Oxide, Timinox, and other antimony oxide pigments, and lithopone and other sulphide pigments.

The resin solutions or varnish solutions employed may be any one of the various resinous materials used in synthetic enamel manufacture, as for instance fatty oil or oil acid modified polyhydric alcohol-polybasic acid resins, urea-formaldehyde resins, or the phenol-formaldehyde type of resins. The varnish solutions may be the vegetable or fish oil type natural rosins, gilsonite or pitch compositions, ester gum, or other natural resins, or modified natural resins. It is to be understood that these vehicles are not inclusive, but are cited to indicate that all types of liquid resins, modified oils, or other film-forming materials including nitrocellulose and other cellulose derivatives may be employed in the process of this invention.

The percentage of solvent in the pigment mixture during the first two stages may vary considerably, depending upon the oil absorption of the particular pigment used. Thus, the solvent in the case of chrome orange pigment is 3.5% and in the case of bone black is 45%.

The percentage of solids in the second stage for these pigments will be about 96% and 71% respectively.

The use of the two worm mechanism described above is preferred because the high pigment content mixture dispersed in the two-roll mill can be reduced successfully in the double worm mechanism in the case of all pigments irrespective of whether the two-roll product is composed of the harder, difficultly dispersible pigments or of the more readily dispersible pigments. The present treatment of a high pigment content pigment mixture containing a small amount of thin liquid vehicle in a two-roller mill prior to reduction to paste or liquid form as described herein is a definite improvement over the prior roller mill practice using high vehicle-low pigment content mixtures followed by reduction to liquid form, and is also, due to more complete dispersion, an improvement over the mixing of a large amount of pigment with vehicle in a mixer of the kneading type followed by further dispersion with the paint liquids in the same mixer. The present invention, therefore, particularly in the case of the softer, easier dispersed pigments, may be practiced by treatment of the specially prepared product of the two-roll mill as above described with the further paint liquids in mechanical mixers ranging from those of the ordinary paddle type to heavy duty plastic mixers.

The paints and enamels obtained by the present process are definitely superior in qualities such as color, gloss, gloss retention, leveling qualities, less settling and general improved film appearance. Paints and enamels as commonly manufactured in the pebble or ball mills, stirring devices, paddle mills, buhrstone mills, and the like have a deficient and undesirable flowing or leveling characteristic, as well as a relatively low gloss, which is overcome in material manufactured according to the present invention. Due to the high efficiency of this process less pigment per gallon of vehicle is required to obtain the maximum film characteristics than was the case with the methods formerly used. In the case of carbon black for instance the ratio of pigment to binder or vehicle is about 380 to 100. By means of treatment with the roller mill in conjunction with that of the special mixing apparatus, powerful shearing stress not otherwise possible is obtained without the danger of burning incident to kneading in Banbury mixers and the like. The increased shearing, which as referred to herein means the pulling apart of the liquid pigment agglomerates and subsequent wetting of the pigment particles, results in a product with higher luster, better color development, less undispersed pigment to be clarified or strained out, and in a product having better luster retention and less of the objectionable settling sometimes found in paint or enamel products due to incomplete dispersion. A much smaller investment in machinery, buildings, etc., is required in the practice of this invention as compared to the large investment required for ball mills, buhr mills, etc. The simplicity of operation results also in low maintenance costs and the high production rate insures better service to customers and a lower investment in inventories.

The products of the present invention, as previously indicated, are of better quality than those obtained by prior methods and possess better settling, improved leveling, higher chalk resistance, better color development of pigments, and higher gloss when products of higher gloss are desired.

As many apparently widely different embodiments of this invention may be made without departing from the spirit and scope thereof, it is to be understood that the invention is not limited to the specific embodiments thereof except as defined in the appended claims.

I claim:

1. In a process for making pigmented coating compositions, the steps which comprise mixing thin liquid vehicle with such large amount of pigment that an apparently dry powdery or pellet-like mixture is obtained which when rolled forms readily distortable sheets of little tenacity, repeatedly passing said mixture between rollers rotating at different speeds until the pigment is dispersed throughout the mixture, and then subjecting the mixture in the presence of solvent vehicle to mixing means, and continuing the mixing with addition of solvent vehicle until a completely dispersed mixture of pigment and solvent vehicle is obtained.

2. The process set forth in claim 1 in which said thin liquid vehicle is a solution of binder and contains from 20% to 60% thinner.

3. The process set forth in claim 1 in which said thin liquid vehicle is a solution of synthetic resin in thinner and contains from 42% to 60% thinner.

4. The process set forth in claim 1 in which said thin liquid vehicle is a solution of oil modified glyceryl phthalate resin in thinner and contains from 42% to 60% thinner.

5. The process set forth in claim 1 in which said thin liquid vehicle is a solution of natural resin in thinner and contains from 20% to 45% thinner.

6. The process set forth in claim 1 in which said thin liquid vehicle is a solution of fatty oil resin in thinner and contains from 20% to 45% thinner.

7. In the manufacture of pigmented coating compositions, the steps which comprise mixing thin liquid vehicle with substantially the largest amount of pigment that will permit the mixture to be rolled into sheets, passing the mixture between rollers rotating at different speeds, placing the dispersed mixture of pigment and vehicle in a mixing vessel to which has been previously added a small amount of the vehicle of the ultimate coating compositions, and subjecting the mixture in said vessel to mixing action which continuously extrudes a portion of the mass under high compressive force and subjects the extruded portion to a wiping action under the pressure of said force, and which continuously incorporates said portions after said action into the body of the mass of material being mixed, and continuing said mixing action with addition of solvent vehicle until a paste or semi-liquid mass is obtained which upon addition of the remaining solvent vehicle to form said coating composition yields a stable, homogeneous dispersion of the pigment particles throughout the solvent vehicle.

8. The process set forth in claim 7 in which said pigment is carbon black and in which the thin liquid vehicle contains 20% to 60% thinner.

WILLARD R. BARRETT.